(12) United States Patent
Aperce et al.

(10) Patent No.: US 8,454,336 B2
(45) Date of Patent: Jun. 4, 2013

(54) SECTOR MOLD WITH RADIAL RECOIL

(75) Inventors: Jean-Claude Aperce, Pont-du-Chateau (FR); Nicolas Jeannoutot, Clermont-Ferrand (FR); Jean-Charles Ferrand, Riom (FR)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 13/382,149

(22) PCT Filed: Jun. 28, 2010

(86) PCT No.: PCT/FR2010/051341
§ 371 (c)(1),
(2), (4) Date: Mar. 22, 2012

(87) PCT Pub. No.: WO2011/001095
PCT Pub. Date: Jan. 6, 2011

(65) Prior Publication Data
US 2012/0177763 A1    Jul. 12, 2012

(30) Foreign Application Priority Data
Jul. 1, 2009  (FR) ...................................... 09 54504

(51) Int. Cl.
*B29C 35/02* (2006.01)

(52) U.S. Cl.
USPC .............................................. 425/46; 425/47

(58) Field of Classification Search
USPC ....................................... 425/46, 47
See application file for complete search history.

(56) References Cited

U.S. PATENT DOCUMENTS

| | | | | |
|---|---|---|---|---|
| 3,460,197 | A | * | 8/1969 | Cantarutti et al. ............... 425/46 |
| 3,461,502 | A | * | 8/1969 | Turk et al. ........................ 425/46 |
| 3,464,090 | A |   | 9/1969 | Cantarutti |
| 3,479,693 | A | * | 11/1969 | Cantarutti ....................... 425/46 |
| 3,850,555 | A |   | 11/1974 | Pasch |
| 3,854,853 | A |   | 12/1974 | Mirtain |
| 3,990,823 | A |   | 11/1976 | Le Moullac |
| 6,066,283 | A |   | 5/2000 | Nara et al. |
| 2005/0112222 | A1 |  | 5/2005 | Kata |

FOREIGN PATENT DOCUMENTS

DE         24 22 406        *   8/1975

\* cited by examiner

*Primary Examiner* — James Mackey
(74) *Attorney, Agent, or Firm* — Cozen O'Connor

(57) ABSTRACT

A vulcanizing mold (10) for a tire includes a frame (24), two lateral shells (26, 28), a plurality of segments (30), a lever (36), a pivot link with an axle (38) for linking the lever (36) to the segment (30), a pivot link with an axle (44) for linking the lever (36) to the driving shell (26), a slide ramp (46) for the axle (44) of the pivot link, the lever (36), the pivot link and the slide ramp (46) being arranged such that the axial displacement of the driving shell (26) with respect to the frame (24) causes a displacement of the axle (38) of the pivot link which is substantially exclusively radial with respect to the driving shell (26).

12 Claims, 6 Drawing Sheets

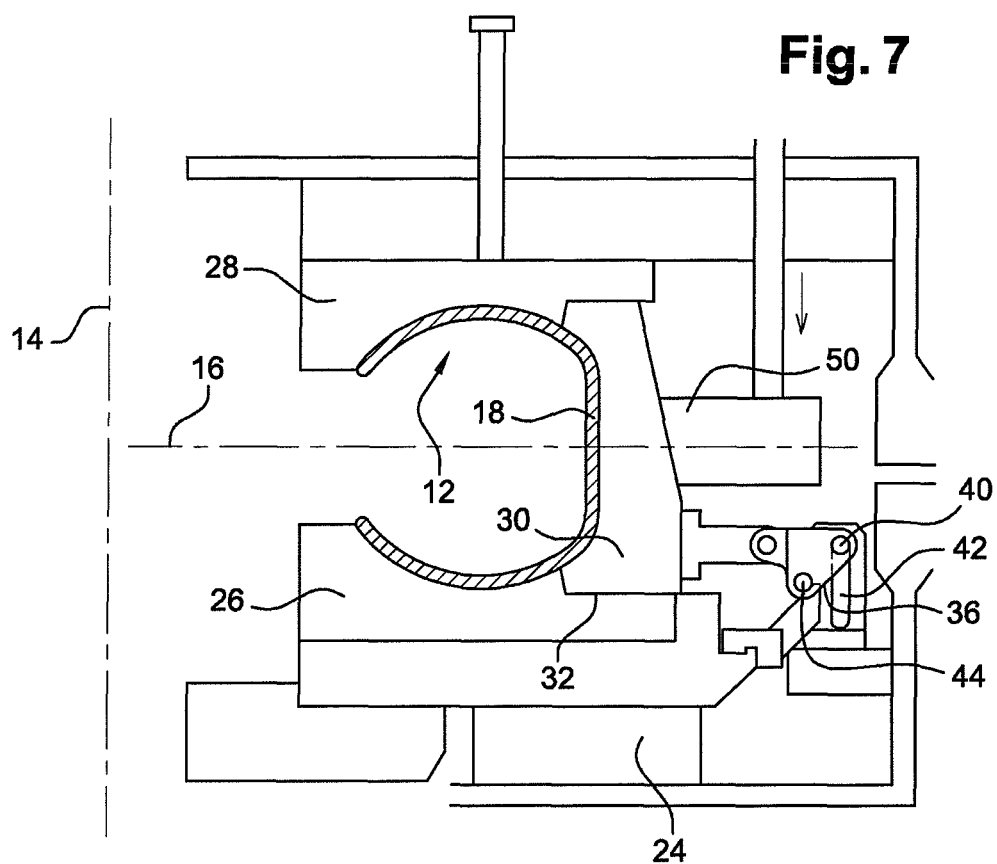
Fig. 7
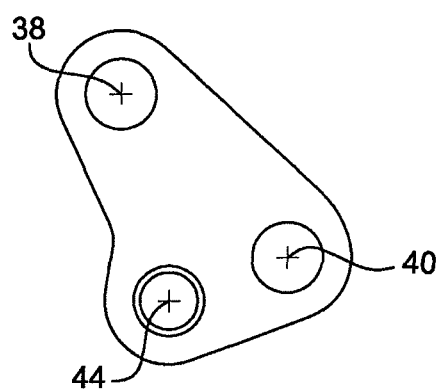 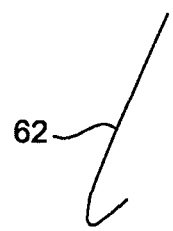
Fig. 8a        Fig. 8b

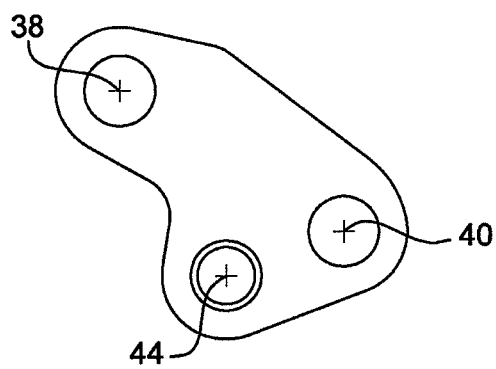 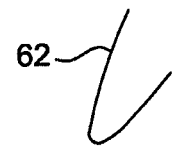
Fig. 9a  Fig. 9b
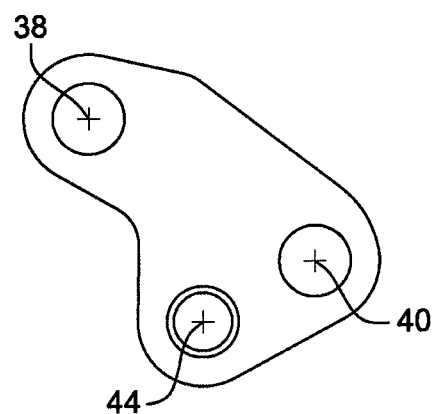 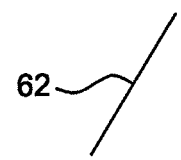
Fig. 10a  Fig. 10b

SECTOR MOLD WITH RADIAL RECOIL

RELATED APPLICATIONS

This is a U.S. National Phase Application under 35 USC §371 of International Application PCT/FR2010/051341, filed on Jun. 28, 2010.

This application claims the priority of French application Ser. No. 09/54504 filed on Jul. 1, 2009, the content of which is hereby incorporated by reference.

FIELD OF THE INVENTION

The invention relates to the field of molds for vulcanizing tires, more particularly segment molds.

BACKGROUND OF THE INVENTION

A segment mold comprises a plurality of separate parts which, by being brought closer to one another, define a virtually toric molding space. In particular, a segment mold has two lateral shells for molding the sidewalls of the tire, and a plurality of peripheral segments situated between the shells for molding the tread of the tire. These peripheral segments are distributed circumferentially at the edge of the shells.

In order to enable the mold to be opened and to make it easier to insert and/or extract the tire into/from the mold, the latter is generally equipped with various hydraulic cylinders acting on the various components that constitute the mold. In particular, the two shells, which are generally arranged horizontally, are connected to vertical actuators of a press and the various segments of the mold are connected to horizontal actuators of the press.

It therefore appears that the overall architecture of the vulcanizing mold from the prior art is relatively complex owing to the presence of various elements, each with different kinematics. Furthermore, the movements of the shells and the segments are multidirectional and hence relatively complex.

SUMMARY OF THE INVENTION

One object of the invention is to provide a simplified vulcanizing mold.

To this end, one aspect of the invention is directed to a vulcanizing mold for a tire, the tire having a general toric shape, substantially symmetrical about an axis, characterized in that it comprises:
a frame,
two lateral shells offset axially relative to each other and mounted so as to be capable of axial translational movement with respect to the frame,
a plurality of segments distributed circumferentially at the edge of the shells and arranged axially between the two shells, the segments being mounted so as to be capable of radial translational movement with respect to the shells,
means for coupling the segments to one of the two shells, called the driving shell, comprising a lever, means for linking the lever to the segment which comprise a pivot link with an axle orthogonal to the axial and radial directions defined by the mold, means for linking the lever to the driving shell which comprise a pivot link with an axle orthogonal to the axial and radial directions defined by the mold,
guide means for the axle of the means for linking the segment to the driving shell, the coupling means and the guide means being arranged such that the axial movement of the driving shell with respect to the frame causes a displacement of the axle of the means for linking the lever to the segment which is substantially exclusively radial with respect to the driving shell.

The displacement of the axle of the means for linking the lever to the segment is substantially exclusively radial irrespective of whether the lever is or is not actually connected to the segment. The displacement of the segment with respect to the shell does not guide axially the displacement of the axle of the means for linking the lever to the segment with respect to the shell. Indeed, the exclusively radial trajectory of the axle of the means for linking the lever to the segment is imposed by the coupling means and the guide means.

Thus, the free displacement of the axle of the means for linking the lever to the segment is substantially exclusively free. The free movement of this axle corresponds to the movement that this axle would have if it were not connected to the segment.

The guide means impose or guide the axle of the means for linking the lever to the shell so as to impose a displacement on the axle of the means for linking the lever to the segment. The axles of the linking means are arranged such that the displacement imposed on the axle of the means for linking the lever to the segment by the guide means for the axle of the means for linking the lever to the shell is substantially exclusively radial.

In other words, the movement of the axle linking the lever to the segment with respect to the driving shell has an axial component which is substantially zero. As a result, the driving force that displaces the segment with respect to the driving shell and is applied to the segment via the first linking means is parallel to the radial direction and oriented radially towards the outside of the mold. It is thus possible to eliminate the axial forces which generate friction or parasitical movements and enables the modulus of the force exerted on the segment to be considerably reduced as soon as this force is directed exclusively in the radial direction.

By virtue of the presence of the means for coupling the segments of the mold to the driving shell, it is possible to dispense with the use of hydraulic cylinders dedicated specifically to the actuation of each of the segments of the mold. Indeed, in the mold of the invention, the means for displacing the driving shell act indirectly on each of the segments via the coupling means.

The driving shell is displaced by these displacement means in an axial direction, so as to space the two shells apart from each other and thus remove the sidewalls of the tire from the mold. At the same time as the displacement of the driving shell, the segments are displaced in a radial direction so as to remove the tread of the tire from the mold.

Lastly, the use of a lever actuated by the driving shell makes it possible in a simple fashion to displace the segments in the desired direction. This configuration has the advantage that the force exerted on the segments is greatest when the mold is closed, in other words when the lever is in a substantially horizontal position and hence when the lever arm is at its greatest. This is particularly advantageous as it is at the beginning of the opening of the mold that the radial force exerted on the segments must be at its greatest in order to remove the tread patterns from the mold.

A mold according to an embodiment of the invention can also comprise one or more of the following features.

The axle pivot link of the means for linking the lever to the segment connects a back of the segment to the lever.

The axial direction is substantially vertical and the driving shell is the lower shell. In this case, the operation of removing the tire from the mold comprises the following series of steps.

First, hydraulic cylinders act on the upper shell so as to displace it upwards and thus open the mold. Hydraulic cylinders then act on the lower shell, optionally via a movable plate which forms a support for the shell, in order to displace the tire upwards and extract it from the mold. During the displacement of this shell, the coupling means act on the segments so as to space them apart from the tread of the tire such that the tire is no longer in contact with the segments. It is thus relatively straightforward to extract the tire from the mold.

The coupling means are arranged so as to impart a movement with an axial component that is substantially zero between the driving shell and each segment. In other words, this movement is substantially radial. The tire comprises a set of patterns which are generally substantially symmetrical with respect to an equatorial plane of the tire. The forces required to extract the pattern of the tread of the tire from the mold are thus essentially directed in a direction parallel to the equatorial plane such that it is preferable that the segments are removed from the mold in a direction parallel to the equatorial plane, in other words in a radial direction of the tire. Also, given that when the tire is removed from the mold, it is moving because it is carried by the driving shell which is displaced axially, it is important that the movement transmitted to the segments is radial with respect to the tire and not with respect to the frame of the mold which is stationary.

The coupling means comprise means for linking the lever to the frame comprising a pivot link with an axle orthogonal to the axial and radial directions defined by the mold. The axles of the means for linking the lever to the segment, to the driving shell and to the frame are preferably substantially parallel to one another and arranged on the lever at the vertices of a triangle. In one embodiment, the axle of the means for linking the lever to the frame can be fixed with respect to the frame. In another embodiment, this axle can also be capable of moving with respect to the frame. Thus, for example, the means for linking the lever to the frame comprise a sliding pivot link with an axle mounted so as to slide in a slideway, where the sliding direction is substantially axial. In this way, it is possible to allow the driving shell to be lowered without causing an opposite, radially inward movement of the segment with respect to the driving shell and to allow a new green tire to be inserted in the following cycle. The means for linking the lever to the frame preferably comprise a slideway for the sliding and guidance of the axle of the means for linking the lever to the frame. This slideway makes it possible to limit the travel of the axle of the means for linking the lever to the frame during the axial movements of the driving shell.

In one embodiment, the triangle is a right triangle and the axle of the means for linking the lever to the driving shell passes through the right-angled vertex of the right triangle.

In one embodiment, the guide means comprise a slide ramp for the axle of the means for linking the lever to the driving shell, which slide ramp is carried by the driving shell. The ramp makes it possible to guide the displacement of the axle of the means for linking the lever to the shell.

Advantageously, the slide ramp is substantially rectilinear. In the case of a right triangle, the trajectory of the movement of the axle of the means for linking the lever to the shell is substantially rectilinear. The direction in which the axle of the means for linking the lever to the shell slides then forms, with the axial direction of the translational movement of the driving shell, an angle that is equal to the angle of the vertex of the triangle through which the axle of the means for linking the lever to the segment passes.

In the case of a triangle that is not a right triangle, the trajectory of the movement of the axle of the means for linking the lever to the shell is not rectilinear. A more complex, non-rectilinear ramp must then be provided to guide the displacement of the axle of the means for linking the lever to the shell whilst at the same time ensuring an exclusively radial movement of the axle of the means for linking the lever to the segment.

In another embodiment, the guide means comprise a slideway for the sliding of the axle of the means for linking the lever to the driving shell (26), which slideway is formed in the driving shell.

In yet another embodiment, the guide means comprise a connecting rod connected respectively to the lever and to the driving shell by pivot links with axles orthogonal to the axial and radial directions defined by the mold.

BRIEF DESCRIPTION OF THE DRAWINGS

The invention will be better understood upon reading the following description, given purely by way of example and made with reference to the attached drawings, in which:

FIGS. 1 to 7 are diagrams in an axial vertical section through a mold according to an embodiment of the invention during various successive steps in the molding of a tire, FIGS. 8 to 10 are diagrams which illustrate various forms of the lever of the mold in FIG. 1 and the respective kinematics of these levers during a molding operation.

DETAILED DESCRIPTION OF THE DRAWINGS

Figure 1:
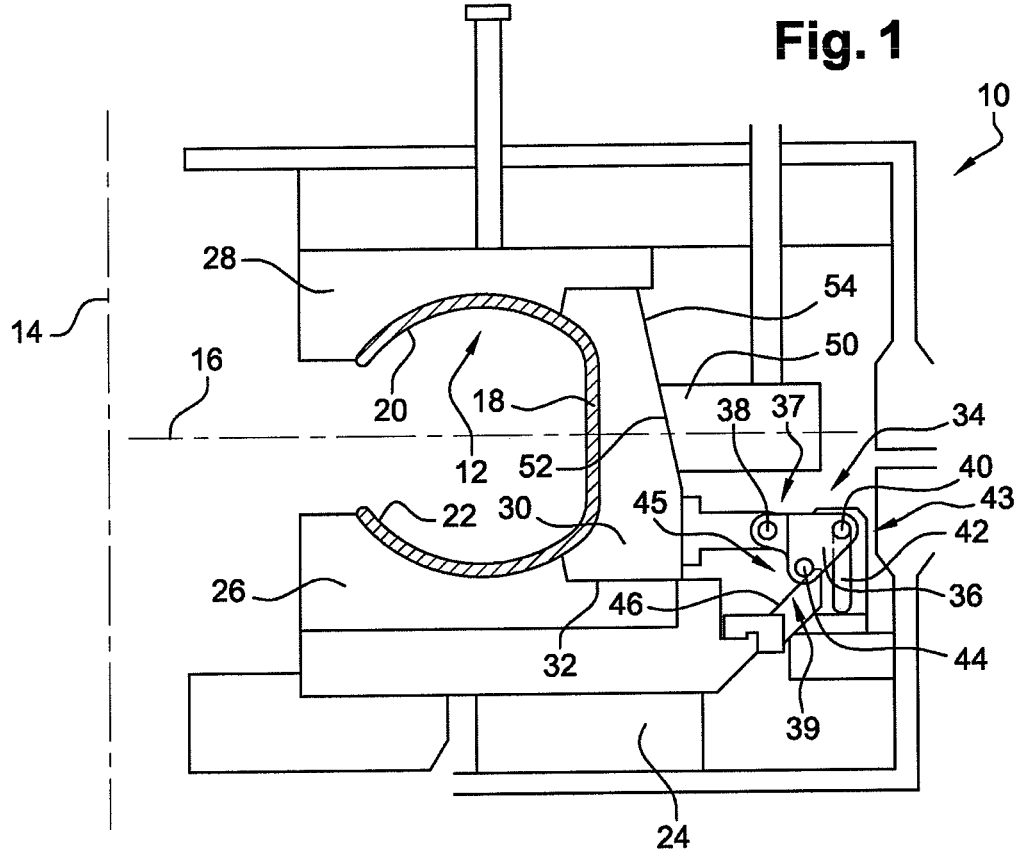

A vulcanizing mold 10 for a tire 12 is shown in FIG. 1.

With reference to the tire 12, an axial direction 14 that substantially coincides with the axis of revolution of the tire is defined. With reference to this axis 14, radial directions are defined, one radial direction 16 being shown in FIG. 1.

FIG. 1 is thus a diagram in an axial section through the mold 10, in other words a diagram shown in the plane defined by the axial 14 and radial 16 directions. The tire 12 comprises a tread 18 and two sidewalls 20 and 22 arranged on either side of the tread.

The mold 10 is arranged in such a way that, when the tire is inside the mold 10, the axial direction 14 is substantially vertical and the radial direction 16 is substantially horizontal.

The mold 10 comprises:

a frame 24, two lateral shells, a lower 26 and an upper 28, offset from each other relative to the axis 14 and intended to come into contact with the sidewalls 22 and 20, respectively, where the shells may be carried by plates of the mold such that the shells can be changed in order to change the markings on the sidewalls of the tire, a plurality of segments 30 distributed circumferentially about the axis 14 at the edge of the shells 26 and 28 and arranged axially between the two shells 26 and 28, the segments 30 being intended to come into contact with the tread 18 of the tire.

Given that FIG. 1 is a view in an axial section, only one segment 30 can be seen in this Figure. In what follows, the invention will be described with reference to this segment 30, it being understood that the invention is replicated identically on each of the segments.

The two lateral shells 26 and 28 are mounted so that they are capable of vertical axial translational movement with respect to the frame 24. To this end, conventional means for displacing the shells are used, for example hydraulic cylinders.

The segment 30 is mounted so that it is capable of radial translational movement with respect to the lower shell 26. In order to achieve this, the segment 30 and the lower shell 26 comprise complementary plane surfaces of the segment 30 and the lower shell 26 in contact in a substantially horizontal plane 32. The plane 32 forms a surface for the friction of the segment 30 on the lower shell 26 such that the connection between these two elements is of the plane bearing type, in other words the relative movement of these two parts is limited to translational movement in a horizontal plane, in other words substantially orthogonal to the axial direction 14.

The mold 10 also comprises means 34 for coupling the segment 30 to the lower shell 26 which are arranged such that an axial displacement of the lower shell 26, also called the driving shell, with respect to the frame 24 causes a radial displacement of the segment 30 with respect to the lower shell 26.

The coupling means 34 comprise a lever 36, also called a crank, with a substantially triangular shape and contained in the radial plane defined by the axes 14 and 16.

The coupling means 34 comprise means 37 for linking the lever 36 to the segment 30 comprising a pivot link with an axle 38 oriented orthoradially, in other words orthogonally to the axial direction 14 and to the radial direction 16. The pivot link with an axle 38 is of the non-sliding pivot or simple pivot type.

The coupling means 34 comprise means 39 for linking the lever 36 to the frame 24 comprising a link of the sliding pivot type with an axle 40 carried by the lever 36. For the reasons explained above, the preferred embodiment shown in FIG. 1 provides that the axle 40 is mounted so as to slide in a slideway 42 of the frame 24 where the direction of sliding is substantially axial. As an alternative, this axle can be fixed with respect to the frame 24.

Lastly, the coupling means 34 comprise means 43 for linking the lever 36 to the lower shell 26 comprising a pivot-type link with an axle 44 carried by the lever 36. The pivot link with an axle 44 is the type with a pivot which can move with respect to the shell 26.

The mold 10 also comprises means 45 for guiding the axle 44 which comprise a slide ramp 46 for the axle 44. The axle 44 is mounted so as to slide on the ramp 46, integral with the lower shell 26. The coupling means 34 and the ramp 46 are arranged such that the axial displacement of the lower shell 26 with respect to the frame 24 causes a substantially exclusively radial displacement of the axle 38 with respect to the shell 26.

In FIGS. 1 to 7, in order to make the drawings clearer, only the ramp 46 and the slideway 42 are shown, visible as if the lever 36 were transparent.

The upper shell 28 is substantially symmetrical with the lower shell 26 with respect to the equatorial plane of the tire, in other words with respect to a plane perpendicular to the direction 14 and including the direction 16.

The mold 10 also comprises a closing ring 50 which can move in an axial direction with respect to the upper shell 28 and comprising a sliding surface 52 which is inclined and arranged so as to slide against an outer surface 54 of the segment 30 so as to exert a radial force oriented towards the centre of the tire on the segment 30 when the ring 50 is displaced downwards and slides on the surface 54.

We will now describe the various steps in a method for opening and closing the mold 10, with reference to FIGS. 1 to 7.

In a first step shown in FIG. 1, the mold 10 is closed, in other words the shells 26 and 28, as well as the segments 30, are in a closed position and surround the tire 12. It is when the mold 10 is in this configuration that the vulcanization of the tire 12 can take place.

In this configuration, the lower shell 26 bears with its underside against a part of the frame 24 and the segments 30 are pulled towards the axis 14 of the tire, in particular under the effect of the ring 50 bearing against the rear surface 54 of the segments 30.

Once the vulcanization has taken place, the mold is opened, first by displacing the upper shell 28 upwards until the upper part of the mold 10 is uncovered. It will thus be noted in FIG. 2 that the upper shell 28 is no longer visible.

Figure 2:
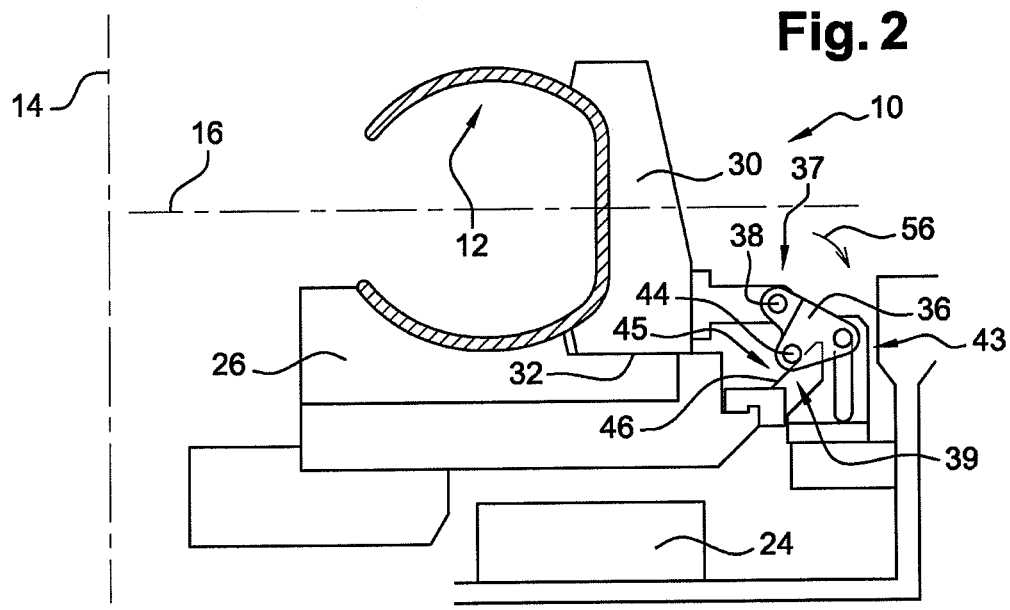
Figure 3:
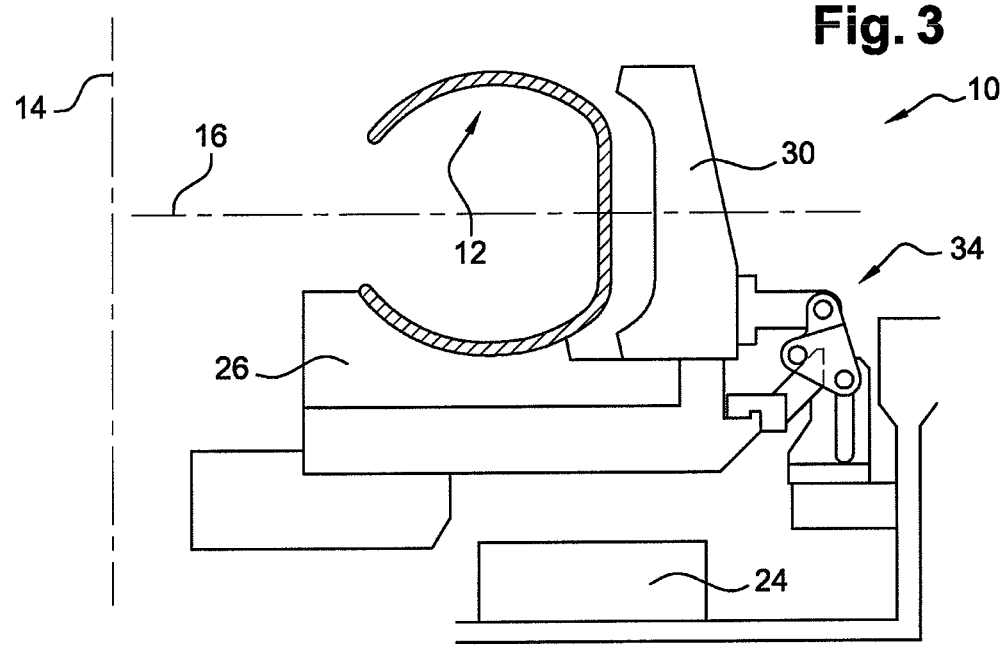

Despite the absence of the upper shell 28, the tire 12 is still held captive between the segments 30 and the lower shell 26. Also, in a subsequent step the lower shell 26 is displaced upwards with respect to the frame 24, as can be seen in FIG. 2.

During this displacement, the ramp 46 acts on the movable pivot 44 so as to pivot the lever 36 about the axle 40 in the direction indicated by the arrow 56.

The pivoting about the axle 40 of the lever 36 with respect to the frame 24 causes the lever 36 to pull the segment 30 backwards via the link 38. Thus, by pulling the segment 30 backwards, it slides along the surface 32 on the lower shell 26 and gradually moves away from the tread 18 of the tire 12.

The axle 38 is displaced with a substantially exclusively radial movement with respect to the driving shell. The axle 40 is displaced with a substantially exclusively axial movement with respect to the shell and comes to abut the upper end of the slideway 42. This can be seen particularly well in FIG. 3 which shows the mold 10 in a configuration in which the lower shell 26 is spaced far apart from the frame 24, which, via the coupling means 34, has caused a gap between the tire 12 and the segment 30 which is sufficient to allow the tire 12 to be extracted from the mold 10.

Figure 4:
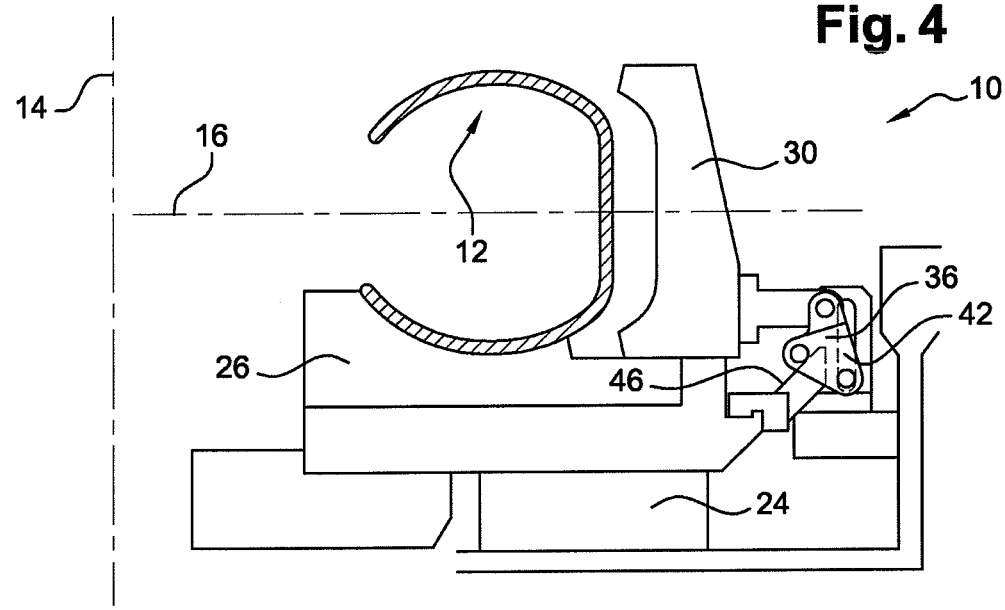

In a subsequent step shown in FIG. 4, the lower shell 26 has been lowered against the frame 24. When the lower shell 26 is lowered in this way, the lever 36 slides downwards in the slideway 42 of the sliding pivot link between the lever 36 and the frame 24. The lower shell 26 can thus be lowered without the segments 30 being closed.

Figure 5:
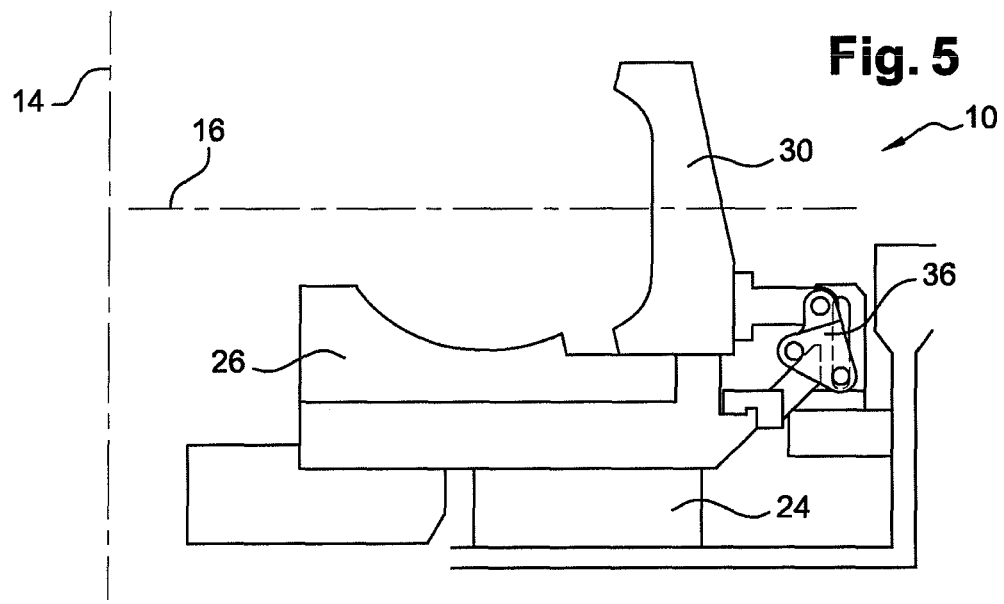

The mold 10 then assumes an open rest configuration shown in FIG. 4 in which the lower shell 26 is in the bottom position and the segments 30 are open. In this configuration, the tire 12 can be extracted from the mold which is then empty as shown in FIG. 5.

Figure 6:
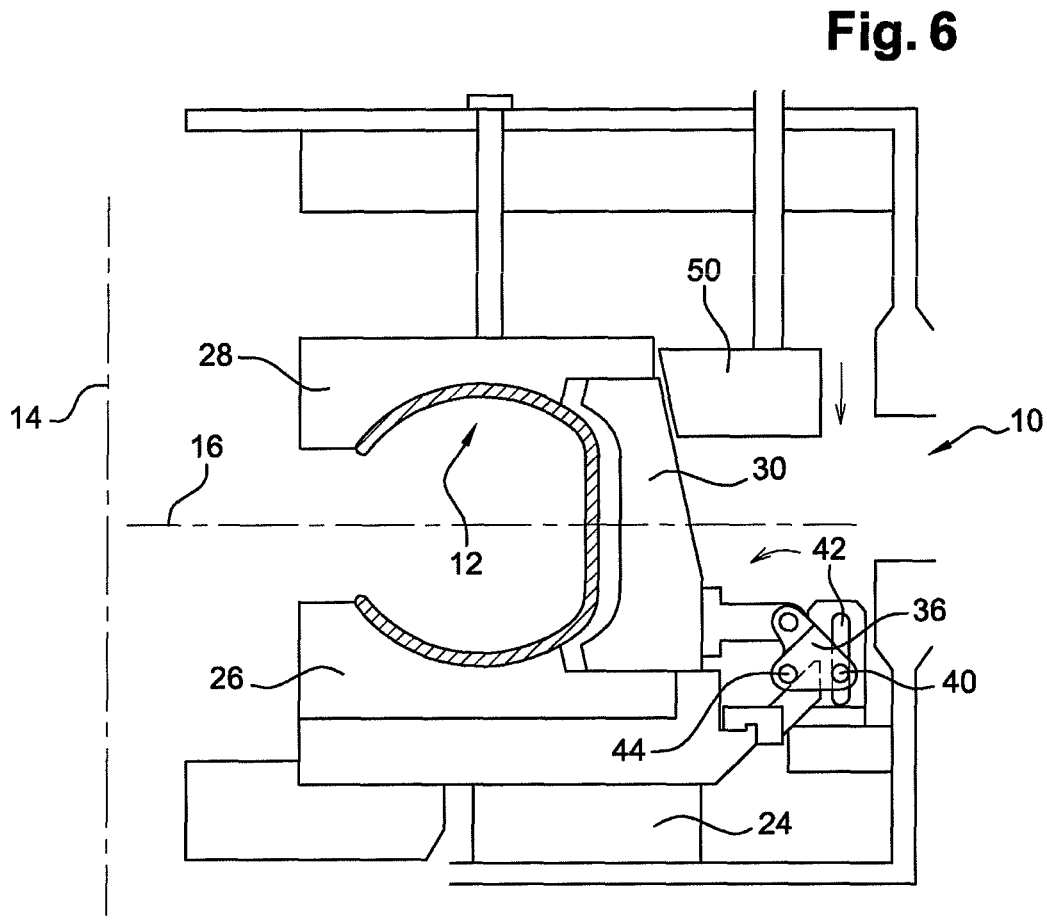

In a subsequent step, a new green tire 12 is placed inside the open mold which is then closed by lowering the upper shell 28 until it comes into contact with the segments 30 which are still in the open position as shown in FIG. 6.

Then, as shown in FIG. 7, the closing ring 50 is acted on in order to lower it so that it slides against the rear surface of the segment 30. This sliding causes the segments 30 to close towards the axis of the mold until they come into contact with the tread of the tire 12, in other words until they assume their closed molding position.

In this step in which the segments 30 are closed, the lever 36 pivots substantially about the axle 44 by virtue of the axle 40 sliding in the slideway 42 until it assumes the initial position shown in both FIGS. 1 and 7.

The kinematics which have just been described show that, when the mold is opened, the segment 30, under the effect of the lever 36, slides on the lower shell 26 along the sliding surface 32.

For the axial component of the movement between the shell 26 and the segment 30 to be substantially zero, during the rotation of the lever 36 about the axle 40 the axle 38 must be displaced with respect to the lower shell 26 in an exclusively radial direction. However, as mentioned above, the arrangement of the axles 38, 44, 40 relative to one another on the lever 36 determines the trajectory to be imposed on the movable pivot 44.

FIGS. 8 to 10 each show:

a) a particular arrangement of the axles 38, 40 and 44 on the lever 36, b) the trajectory 62 followed by the axle 44 with respect to a reference system linked to the lower shell 26.

In FIG. 8, the angle at the vertex 44 of the lever 36 is approximately 82°. In FIG. 9, the angle at the vertex 44 of the lever 36 is approximately 98°. In FIG. 10, this angle at the vertex is 90°, in other words the triangle formed by the axles 38, 40 and 44 on the lever 36 is a right triangle.

It can then be appreciated that the trajectory 62 of the axle 44 is rectilinear only when the triangle formed by the three linking axles of the lever 36 is a right triangle. Indeed, as the slideway 42 guides the axle 40 in the axial direction and the angle at the vertex 44 is a right angle, the movement of the axle 38 is, under the effect of the ramp 46, substantially radial.

In other words, if the link between the lever 36 and the lower shell 26 is a link forming a pivot which can move in the direction of the rectilinear trajectory 62, it follows that the trajectory of the axle 38 with respect to the lower shell 26 is rectilinear and substantially radial. Moreover, it will be noted that this direction of sliding forms, with the axial direction of the translational movement of the lower shell 26, an angle equal to the angle of the vertex of the triangle through which the axle 38 passes. The rectilinear shape of the ramp 46 and the angle formed by the sliding ramp 46 with the axial direction 14 are thus identical respectively with the shape of the trajectory 62 and with the angle formed by the trajectory 62 with the axial direction 14.

The direction of sliding of the axle 44 forms, with the axial direction 14, an angle equal to the angle at the vertex of the triangle through which passes the axle 38 of the pivot link between the lever 36 and the segment 30.

If a lever with a triangular shape that is not a right triangle is to be used whilst preserving a radial movement between the lever and the segment 30, a link must then be provided between the lever and the lower shell 26 which is adapted so as to ensure a curving trajectory like the trajectory 62 shown in FIGS. 8b and 9b. Such a link is of course more complex to create and could consist in modifying the ramp 46 and/or the slideway 42, for example in the form of a non-rectilinear ramp and/or slideway.

The invention is not limited to the embodiment which has just been described.

Figure 11:
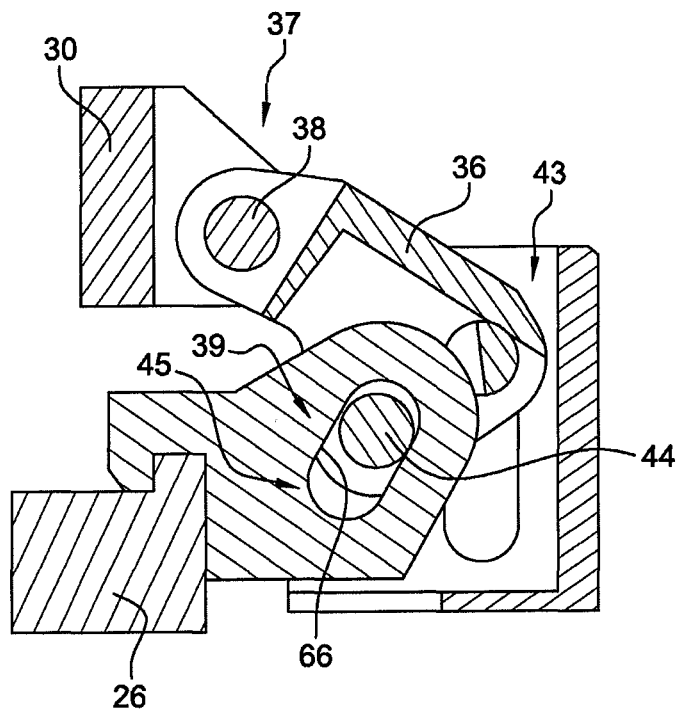
FIG. 11 is a side view of the link between the driving shell, the frame and a segment of the mold shown in FIGS. 1 to 7.

Indeed, in a first alternative embodiment shown in FIG. 11, the axle 44 of the movable pivot link slides not on a ramp 46 but in a slideway 66. In this first alternative embodiment, the coupling means 34 and the slideway 66 are arranged such that the axial displacement of the lower shell 26 with respect to the frame 24 causes a substantially exclusively radial displacement of the axle 38 with respect to the shell 26.

Figure 12:
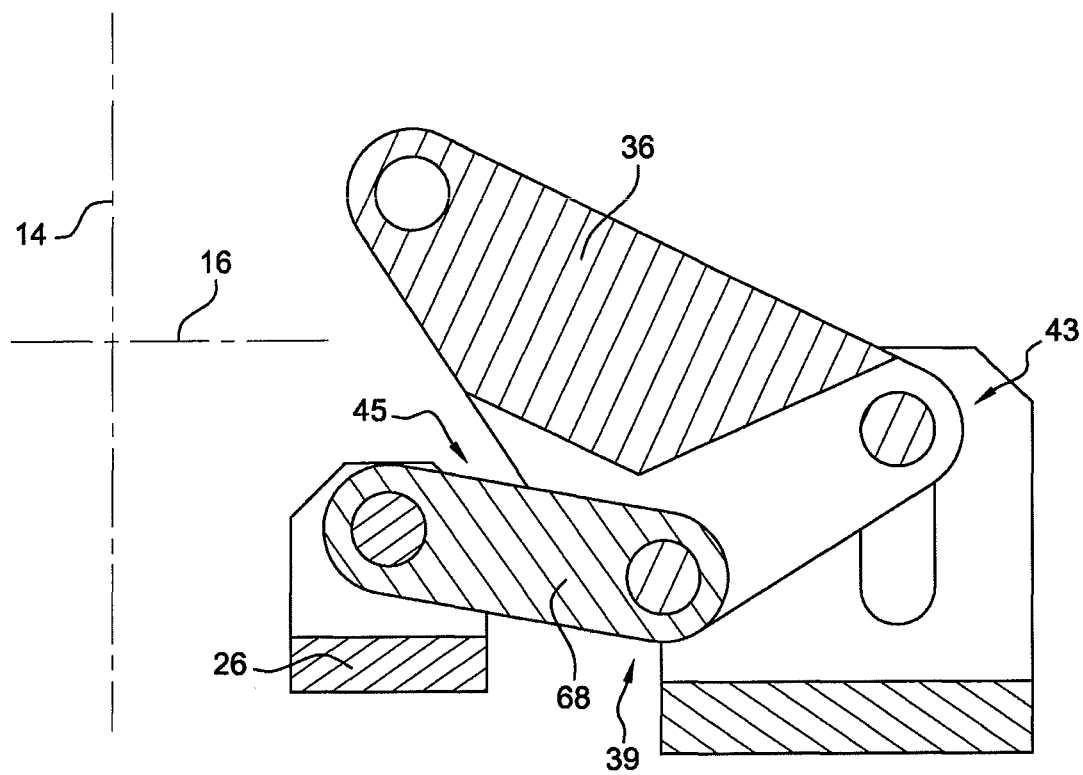
FIG. 12 is an identical diagram to FIG. 11 of an alternative embodiment of the invention.

In another alternative embodiment shown in FIG. 12, the means 43 for linking the lever 36 to the driving shell 26 and the guide means 45 comprise a connecting rod 68 connected respectively to the lever 36 and to the driving shell 26 by, respectively, a pivot link 64 forming the movable pivot, and a pivot link 65, the axles of which are orthogonal to the axial and radial directions 14 and 16. The axles 38, 40 and 64 are arranged on the lever 36 at the vertices of a right triangle. The axle 64 of the means 43 linking the lever 36 to the shell 26 passes through the right-angled vertex of the right triangle. The distance between the axles 64 and 65 of the connecting rod is substantially equal to the distance separating the axles 64 and 40 on the lever. The axial movement of the driving shell 26 thus imposes on the movable pivot 64 rotational movements about the axle 65 with respect to the shell and about the axle 40 with respect to the frame, which movements, combined with an axial translational movement of the axle 40 with respect to the shell 26 cause a substantially rectilinear movement of the axle 64. In this second alternative embodiment, the connecting rod 68 is arranged in such a way that, when the driving shell 26 is displaced axially with respect to the frame 24, the movement of the axle 38 with respect to the driving shell 26 is substantially exclusively radial. It is thus possible to vary the geometrical characteristics of the connecting rod, for example the length of the connecting rod 68 and the position of the axles 64, 65.

The invention claimed is:

1. A vulcanizing mold for a tire, the tire having a general toric shape, substantially symmetrical about an axis comprising:
a frame;
two lateral shells offset axially relative to each other and mounted so as to be capable of axial translational movement with respect to the frame;
a plurality of segments distributed circumferentially at the edge of the shells and arranged axially between the two shells, the segments being mounted so as to be capable of radial translational movement with respect to the shells;
means for coupling the segments to one of the two shells, called the driving shell, comprising a lever, means for linking the lever to the segment which comprise a pivot link with an axle orthogonal to the axial and radial directions defined by the mold, means for linking the lever to the driving shell which comprise a pivot link with an axle orthogonal to the axial and radial directions defined by the mold;
guide means for the axle of the means for linking the lever to the driving shell; and
the coupling means and the guide means being arranged such that the axial displacement of the driving shell with respect to the frame causes a displacement of the axle of the means for linking the lever to the segment which is substantially exclusively radial with respect to the driving shell.

2. The mold according to claim 1, wherein the pivot link with an axle of the means for linking the lever to the segment connects a back of the segment to the lever.

3. The mold according to claim 1, wherein axial direction is substantially vertical and the driving shell is the lower shell.

4. The mold according to claim 1, wherein the coupling means are arranged so as to impart a movement with an axial component that is substantially zero between the driving shell and each segment.

5. The mold according to claim 1, wherein the coupling means comprise means for linking the lever to the frame which comprise a pivot link with an axle orthogonal to the axial and radial directions defined by the mold.

6. The mold according to claim 5, wherein the axles of the means for linking the lever to the segment, to the driving shell and to the frame are substantially parallel to one another and arranged on the lever at the vertices of a triangle.

7. The mold according to claim 5, wherein the means for linking the lever to the frame comprise a sliding pivot link with an axle mounted so as to slide in a slideway, wherein the sliding direction is substantially axial.

8. The mold according to claim 6, wherein the triangle is a right triangle and the axle of the means for linking the lever to the driving shell passes through the right-angled vertex of the right triangle.

9. The mold according to claim 1, wherein the guide means comprise a slide ramp for the axle of the means for linking the lever to the driving shell, which slide ramp is carried by the driving shell.

10. The mold according to claim 8, wherein the guide means comprise a slide ramp for the axle of the means for linking the lever to the driving shell, which slide ramp is carried by the driving shell, and wherein the slide ramp is substantially rectilinear.

11. The mold according to claim 1, wherein the guide means comprise a slideway for the axle of the means for linking the lever to the driving shell, wherein said slideway is formed in the driving shell.

12. The mold according to claim 1, wherein the guide means comprise a connecting rod connected respectively to the lever and to the driving shell by pivot links with axles which are orthogonal to the axial and radial directions defined by the mold.

\* \* \* \* \*